W. L. BURNER, J. D. BENBOW & D. GREENE.
COMPRESSION LOCK FOR DUMP CARS.
APPLICATION FILED MAR. 19, 1917.

1,254,201.

Patented Jan. 22, 1918.
3 SHEETS—SHEET 1.

WITNESS
W. A. Williams.

INVENTORS
William L. Burner
James D. Benbow
David Greene
BY
Geo. W. Rightmire.
ATTORNEY

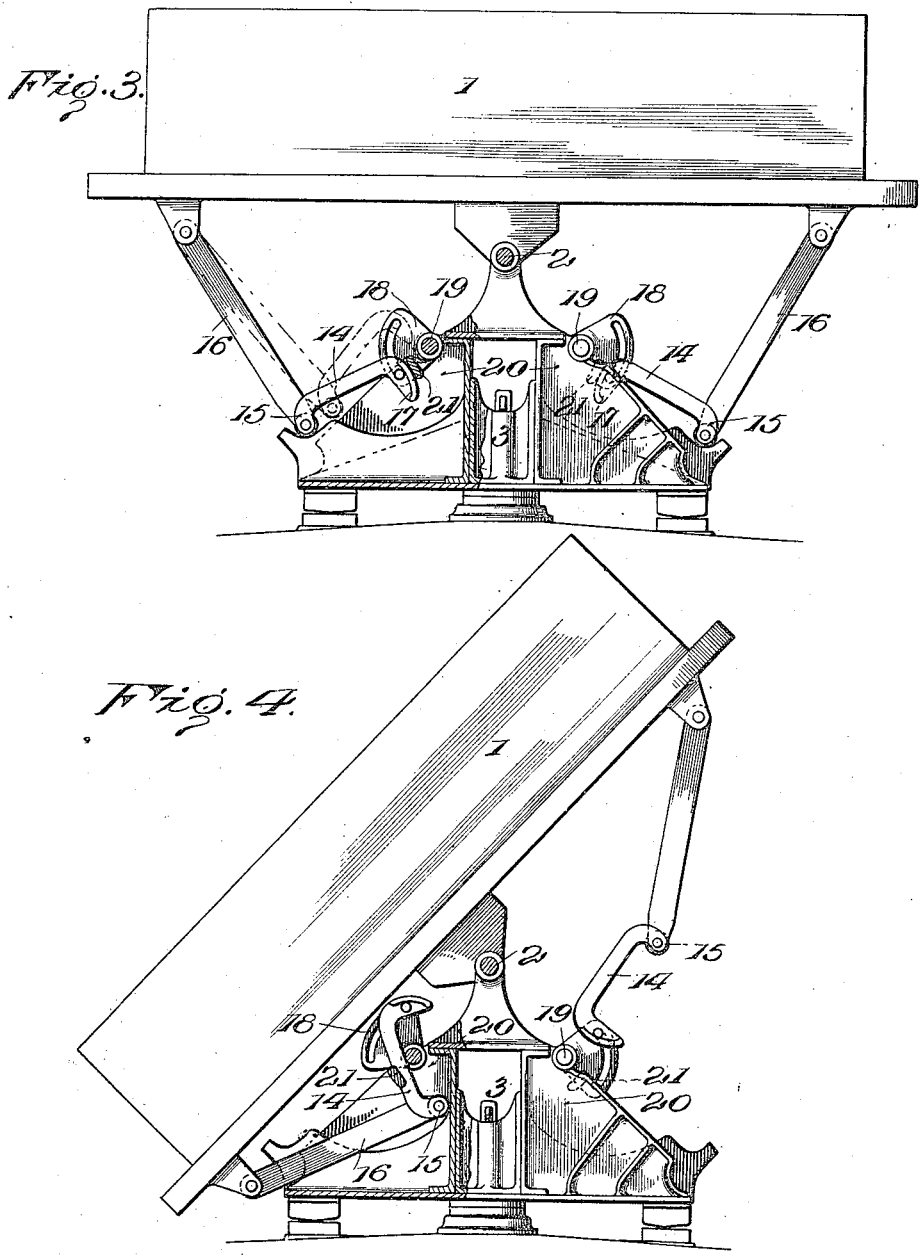

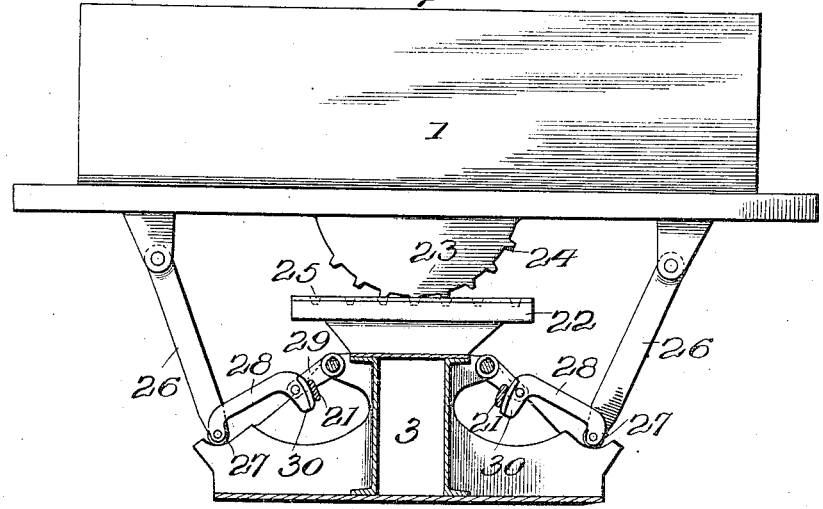
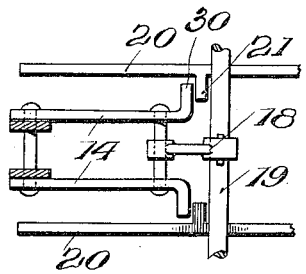
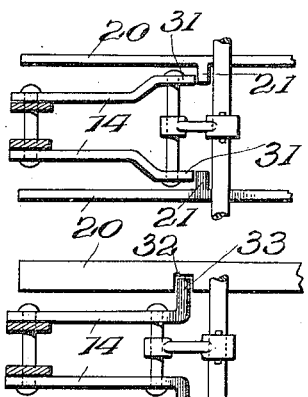

UNITED STATES PATENT OFFICE.

WILLIAM L. BURNER, JAMES D. BENBOW, AND DAVID GREENE, OF COLUMBUS, OHIO, ASSIGNORS TO THE KILBOURNE & JACOBS MANUFACTURING COMPANY, OF COLUMBUS, OHIO.

COMPRESSION-LOCK FOR DUMP-CARS.

1,254,201.

Specification of Letters Patent.  Patented Jan. 22, 1918.

Application filed March 19, 1917.  Serial No. 155,855.

*To all whom it may concern:*

Be it known that we, WILLIAM L. BURNER and JAMES D. BENBOW and DAVID GREENE, citizens of the United States of America, residing at Columbus, in the county of Franklin and State of Ohio, have invented certain new and useful Improvements in Compression-Locks for Dump-Cars, of which the following is a specification.

Our invention relates to improvements in locks for dump cars and provides a compression lock which acts as a prop to hold the car bed in normal position and when the prop at one side is appropriately disengaged the car bed will dump toward that side. Dump car bed locks have generally been of the tension type operating by restraining the bed from tipping to the opposite side and furnishing no support to prevent the bed from tipping to the side on which the lock in question is placed; the distinction being between constructions which operate to prevent dumping through a push as it were on the one hand and a pull on the other.

In the drawings which are hereto attached and hereby made a part of this specification, Figure 1 is a transverse vertical section through a car underframe, the bed being shown diagrammatically, with parts omitted as will be understood upon inspection.

Fig. 3 is an end view partly in section of a car showing the locking means modified, the car bed being in normal position.

Figure 1:
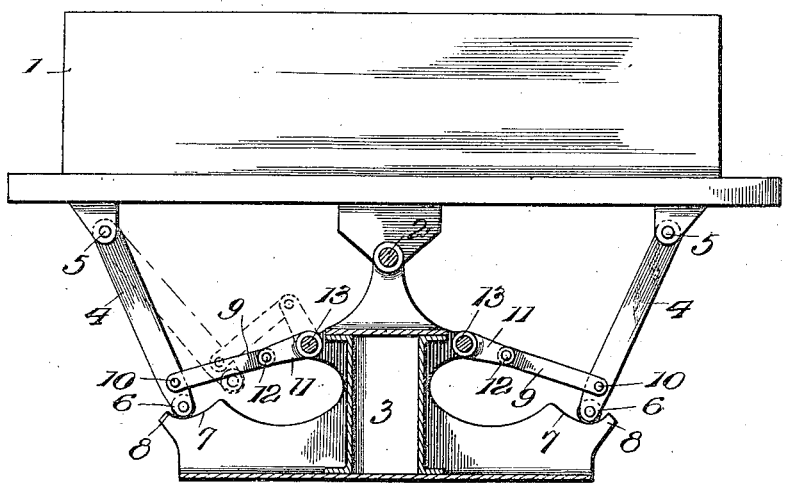

Fig. 4 corresponds to Fig. 3, except that the car bed is in dumped position.

Fig. 5 shows our improvements applied to a car having a bed of the rocker type.

Figs. 6, 7, and 8 show various designs for the locking of the curved link member in its normal position.

In the drawings, 1 is the car bed pivotally mounted at 2 on the underframe 3; the locking construction is identical on the two sides, therefore only one need be described. At 4 is shown the lock or compression bar pivoted on the underface of the car bed at 5, to permit a lateral swinging movement, and provided at its lower end with the roller, or smooth rounded end if desired, 6, adapted for engagement with the underframe at 7, the outward movement thereof being limited by the shoulder 8. The depressed curved face 7 assures the correct positioning of the roller 6.

The link 9 is pivotally connected with the lock bar 4 at 10 and with the rocker arm 11 at 12, the rocker arm being carried on the longitudinal shaft 13 which is adapted to be operated in any of the well-known ways. The parts being in the position indicated in Fig. 1, the car bed 1 is supported by the bar 4 which is held in proper position on the face 7 by the link 9 and the rocker arm 11, and this position of the parts will be maintained so long as the shaft 13 is not operated; but upon rotation of said shaft the rocker arm lifts the link 9, which retracts the bar 4 over the depressed face 7 as illustrated in the dotted construction of Fig. 1, whereupon the support of the car bed having been removed the bed tilts to the dumped position illustrated in Fig. 2. The locking parts on the elevated side of the car bed assume the position illustrated in Fig. 2 on the right hand side thereof.

When the car bed is being righted the locking parts on the lowered side of the car bed are unflexed and gradually drawn out to the normal position shown in Fig. 1, wherein the bar 4 is acting as a prop or support and the corresponding bar on the opposite side is acting likewise, so that the car bed is held in normal position by the two bars under compression, wherefore this means for securing the car bed is appropriately described as a compression lock. The outward movement or swing of the compression lock bar is determined by the link and rocker arm, as appears in Fig. 1, and security in this location is afforded by the depressed curved face 7 and the outer shoulder or stop 8, in conjunction with the operating shaft 13 in its locked position.

In Figs. 3 and 4 we have shown another form of the locking devices, wherein the link 14 is provided with the curved end 15 for pivotal connection with the bar 16, and has at its other end the nose 17 pivotally connected with the slotted rocker arm 18 carried on the shaft 19.

On the housing 20 on the underframe is the stop 21 with which the nose 17 engages when the car bed is in normal position, as illustrated in Fig. 3, and the parts are thereby held against an accidental unlocking.

When the car bed is dumped, as appears in Fig. 4, the slotted rocker arm 18 is rotated upwardly, carrying the nose end of the link 14 therewith whereby the compression lock bar 16 is retracted or swung inwardly until the parts assume the position shown in Fig. 4 at the left hand side thereof. Meanwhile the parts on the opposite side of the car have been moved to the position shown in Fig. 4, and it is noted that the slot in the rocker arm has permitted sufficient movement of the link upwardly without disturbing the position of the shaft, which consequently remains in its locked position, on that side of the car.

In Figs. 3 and 4, therefore, our construction provides a security against the unlocking effect of an accidental force exerted inwardly against the link 14 when the shaft 19 has not been operated and the car bed is in normal position, and an additional security in rendering the unlocking and rotation of the shaft unnecessary on the side of the car on which the car bed is elevated during the dumping operation.

Figure 2:
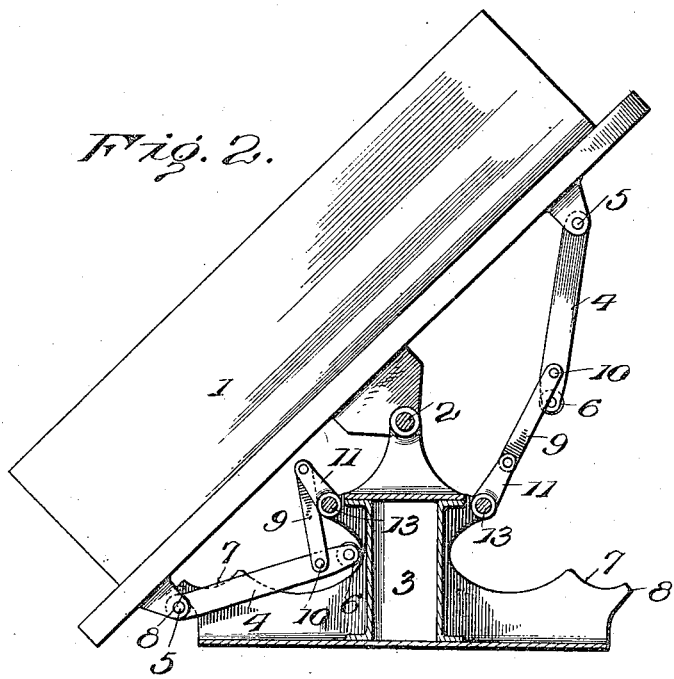
Fig. 2 is a view similar to Fig. 1, except that the car bed is in its dumped position.

It is clear that in Figs. 3 and 4 the function and operation of the compression lock bar 16 is identical with that of the compression lock bar 4 in Figs. 1 and 2.

These safety devices are of great importance in the dump car art, as every such practical precaution adds to the value of the car and its usefulness.

In Fig. 5 is illustrated a car bed constructed to rock on the underframe 22 by means of the rocker 23, security being afforded in the operation by the pins 24 engaging in the openings 25. The compression bar 26 is rounded at the lower end 27 in this construction, but of course the roller shown in the earlier drawings may be used if desired; also the link 28 in this construction is directly connected with the rocker arm 29, which is not slotted, these forms being merely variations or modifications possible in constructions of the types herein shown.

In Figs. 6, 7, and 8 are shown varieties of construction of the nose link illustrated at 14 and 28, seen from above in place in the housing 20.

In Fig. 6 the link 14 is bent laterally at its inner end 30, to engage the stop 21, while in Fig. 7 the opening between the link parts 14 is enlarged by bending outwardly at 31, so that the inner end of the link is brought into engagement with the stop 21 as there shown.

In Fig. 8 the housing 20 is recessed at 32, to receive the laterally bent end 33 of the link 14, thereby performing the security function of the stop 21 in the earlier views.

What we claim is:—

1. In a car having a bed adapted to be tilted for dumping and an underframe, a bar arranged for engagement through compression with said car bed and underframe to maintain said car bed in normal position, a shaft, a rocker arm thereon, a link pivotally associated with said bar and said rocker arm, said rocker arm being slotted to permit said link to accommodate its position to the movement of the lock bar on the side of the car bed which is elevated during the dumping operation, without disturbing the normal position of the shaft on that side.

2. In a car having a car bed adapted to be tilted for dumping and an underframe, a bar pivoted on said car bed and adapted for engagement under compression with said underframe to support said car bed against tilting, an operating shaft mounted on said car, a rocker arm having a slot therein on said shaft, a link having pivotal connection with said bar at one end and with said rocker arm through said slot at its other end, and a stop adapted for engagement with said link when the said parts are in normal position.

3. In a car having a car bed adapted to be tilted for dumping and an underframe, a bar pivoted on said car bed and adapted to engage said underframe to support said car bed against tilting, an operating shaft mounted on said car, a rocker arm on said shaft, a link formed with a nose thereon having pivotal connection with said bar at one end and with said rocker arm at its other end, a stop on said underframe adapted to be engaged by said nose when the said parts are in normal position.

In testimony whereof we affix our signatures in the presence of two witnesses.

WILLIAM L. BURNER.
JAMES D. BENBOW.
DAVID GREENE.

Witnesses:
E. P. WEEKS, Jr.,
J. STANTON MOSSGROVE.

Copies of this patent may be obtained for five cents each, by addressing the "Commissioner of Patents, Washington, D. C."